United States Patent
Zhang et al.

(10) Patent No.: US 10,591,689 B2
(45) Date of Patent: Mar. 17, 2020

(54) REFLOW-COMPATIBLE OPTICAL I/O ASSEMBLY ADAPTER

(71) Applicant: Oracle International Corporation, Redwood Shores, CA (US)

(72) Inventors: Chaoqi Zhang, Atlanta, GA (US); Hiren D. Thacker, San Diego, CA (US); Ivan Shubin, San Diego, CA (US); Xuezhe Zheng, San Diego, CA (US); Ashok V. Krishnamoorthy, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 105 days.

(21) Appl. No.: 15/425,887

(22) Filed: Feb. 6, 2017

(65) Prior Publication Data
US 2018/0267265 A1    Sep. 20, 2018

(51) Int. Cl.
*G02B 6/42* (2006.01)
*G02B 6/38* (2006.01)

(52) U.S. Cl.
CPC ......... *G02B 6/4261* (2013.01); *G02B 6/3825* (2013.01); *G02B 6/3849* (2013.01);
(Continued)

(58) Field of Classification Search
CPC .... G02B 6/423; G02B 6/3825; G02B 6/3849; G02B 6/4238; G02B 6/4251; G02B 6/4261; G02B 6/4269
See application file for complete search history.

(56) References Cited

U.S. PATENT DOCUMENTS

| | | | |
|---|---|---|---|
| 6,676,302 B2 * | 1/2004 | Cheng | G02B 6/4206 385/88 |
| 6,749,345 B1 | 6/2004 | Gee et al. | |

(Continued)

FOREIGN PATENT DOCUMENTS

WO    2013074103 A1    5/2013

OTHER PUBLICATIONS

Mahajan et al.; "Embedded Multi-Die Interconnect Bridge (EMIB)—A High Density, High Bandwidth Packaging Interconnect," in Proceedings of 66th ECTC, 2016.
(Continued)

*Primary Examiner* — Thomas A Hollweg
*Assistant Examiner* — Mary A El-Shammaa
(74) *Attorney, Agent, or Firm* — Park, Vaughan, Fleming & Dowler LLP

(57) ABSTRACT

The disclosed embodiments provide an apparatus for connecting one or more optical fibers to an optoelectronic system. This apparatus includes a packaged optoelectronic module (POeM) comprising an optical connector, a silicon photonic (SiP) chip, an integrated circuit (IC) chip, at least one laser chip and a package substrate. The apparatus also includes an assembly adapter enclosing the POeM, wherein the assembly adapter includes a mechanical transfer (MT) ferrule cavity, which includes one or more coarse-alignment structures to guide an MT ferrule enclosing at least one optical fiber during assembly of the apparatus. The assembly adapter is comprised of a solder-reflow-compatible material to facilitate bonding the assembly adapter to a circuit board.

19 Claims, 11 Drawing Sheets

(52) U.S. Cl.
CPC ........... *G02B 6/3897* (2013.01); *G02B 6/423* (2013.01); *G02B 6/4238* (2013.01); *G02B 6/4251* (2013.01); *G02B 6/4257* (2013.01); *G02B 6/4292* (2013.01); G02B 6/4269 (2013.01)

(56) References Cited

U.S. PATENT DOCUMENTS

| | | | | |
|---|---|---|---|---|
| 7,056,032 | B2* | 6/2006 | Cheng | G02B 6/4201 |
| | | | | 385/15 |
| 7,245,813 | B2* | 7/2007 | Brown | G02B 6/3849 |
| | | | | 385/134 |
| 9,159,861 | B2 | 10/2015 | Zhang et al. | |
| 9,164,249 | B2* | 10/2015 | Mathai | G02B 6/4259 |
| 2003/0053766 | A1* | 3/2003 | Cheng | G02B 6/425 |
| | | | | 385/89 |
| 2003/0201462 | A1* | 10/2003 | Pommer | G02B 6/4201 |
| | | | | 257/200 |
| 2005/0156310 | A1 | 7/2005 | Benner et al. | |
| 2005/0196177 | A1 | 9/2005 | Moran | |
| 2005/0220427 | A1* | 10/2005 | Therisod | G02B 6/4201 |
| | | | | 385/92 |
| 2007/0258683 | A1* | 11/2007 | Rolston | G02B 6/4232 |
| | | | | 385/88 |
| 2015/0362686 | A1* | 12/2015 | Wang | G02B 6/4292 |
| | | | | 385/89 |
| 2016/0266340 | A1* | 9/2016 | Zhang | G02B 6/32 |

OTHER PUBLICATIONS

Tseng et al.; "InFO (Wafer Level Integrated Fan-Out) Technology", ECTC 2016.

Liang et al.; "Development of Non-TSV Interposer (NTI) for High Electrical Performance Package", ECTC 2016.

\* cited by examiner

REFLOW-COMPATIBLE OPTICAL I/O ASSEMBLY ADAPTER

GOVERNMENT LICENSE RIGHTS

This invention was made with U.S. government support under Agreement No. HR0011-08-9-0001 awarded by DARPA. The U.S. government has certain rights in the invention.

FIELD

The disclosed embodiments generally relate to the design of optoelectronic circuits. More specifically, the disclosed embodiments relate to the design of a reflow-compatible optical I/O assembly adapter that facilitates connecting optical components on a silicon photonic (SiP) chip to an external optical fiber.

RELATED ART

Silicon photonics is a promising new technology that can potentially provide large communication bandwidth, low latency and low power consumption for both inter-chip and intra-chip connections. In order for silicon photonics to be widely adopted, practical manufacturing techniques need to be developed to assemble SiP circuits. One challenge is to develop a practical technique for manufacturing an optical connector that connects an optical signal from optical components in a silicon photonic chip to an external optical fiber. The task of assembling this type of connection poses significant challenges because of the required micron-scale alignment between the optical connector and the silicon photonic chip, and related issues involving handling of optical fibers.

One promising approach is to use a passive optical connector 103, which is intimately coupled to the on-chip optical I/Os (such as diffraction grating couplers) on one end and presents a low-loss, industry-standard opto-mechanical interface to a fiber array ferrule 102, such as a mechanical transfer (MT) connector) on the other end as illustrated in FIG. 1. This passive optical connector 103 may be made of glass or plastic, and can contain various optical features, such as waveguides, mirrors and lenses. In this way, the assembly requirements are reduced to accurate placement of the passive optical connector 103 with respect to the SiP chip 104, and the MT ferrule 102 containing the fiber array can be attached during system assembly. In a functional optoelectronic system, a SiP chip 104 can be integrated into an optoelectronic module, such as a packaged optoelectronic module (POeM) 105 or a wafer-level (WL) POeM. (See FIG. 2. Also, see [Zhang 2016] U.S. patent application Ser. No. 15/388,186, entitled "Wafer-Level Packaged Optoelectronic Module" by inventors Chaoqi Zhang, et al., filed on 22 Dec. 2016, which is hereby incorporated herein by reference.) In this way, coupled signals from the optical fiber can be converted into electrical signals to be processed by electrical circuitry on an integrated circuit (IC) chip in the POeM 105.

However, the barebones silicon photonic components illustrated in FIGS. 1-2 lack mechanical support and protection, which makes the assembly process challenging and can also degrade optical performance. During the assembly process, the MT ferrule 102 containing the fiber array must be "butt-coupled" with an optical connector 103 using clamping features, where the clamping force can be as high as 10 N. Without proper mechanical support and protection, this clamping force can damage critical optical coupling interfaces, such as: the optical connector-to-SiP-chip interface; the MT-ferrule-to-optical-connector interface; and various fragile system components, such as a glass optical connector and a 0.3 mm thick SiP chip 104.

Moreover, the fine-precision mating structures on the MT ferrule 102 and connector 103, which are used to guarantee a low-loss optical coupling, are prone to damage after multiple assembly insertions. Hence, there is a need for coarse guiding features to reduce the initial offset between MT ferrule 102 and the connector 103 during assembly and thus mitigate abrasion of fine-precision structures.

Also, the assemblies illustrated in FIGS. 1-2 lack features to prevent contamination of sensitive optical facets from the ambient environment. Note that an MT ferrule 102 that encloses the optical fibers is usually the last piece assembled in the system, and may even be assembled in the field. This means the interface of the passive optical connector would remain exposed until then. Therefore, some type of dust-prevention feature is desirable.

Two additional packaging challenges that need to be addressed include providing adequate thermal dissipation for ICs (electronic and optoelectronic), and ensuring the assembly process compatibility with reflow solder I/Os. With regards to the thermal dissipation, note that the high-speed I/O circuits on an IC chip can consume several watts of power, and the optoelectronic chips on the POeM 105 can potentially have multiple high-power-density hot spots.

With regards to the reflow compatibility, note that current-generation, mid-board optoelectronic modules presently employ advanced socket technologies to connect optoelectronic modules with printed circuit boards (PCBs). By using such advanced sockets, an optoelectronic module is attached to the integrated socket at room temperature and will not be exposed to the high reflow temperatures (250-280° C.) required for system assembly. However, the use of these advanced sockets is limited by footprint size because of their associated low I/O density and related reliability issues. Hence, it is desirable to use advanced solder I/Os, such as flip-chip ball grid arrays (FCBGAs), in place of advanced sockets, which means that components of the optoelectronic module may need to be reflow-compatible.

Hence, what is needed is a practical technique for connecting optical components on a SiP chip to an external optical fiber without the drawbacks of the above-described techniques.

SUMMARY

The disclosed embodiments provide an apparatus for connecting one or more optical fibers to an optoelectronic system. This apparatus includes a packaged optoelectronic module (POeM) comprising an optical connector, a silicon photonic (SiP) chip, an integrated circuit (IC) chip, at least one laser chip and a package substrate. The apparatus also includes an assembly adapter enclosing the POeM, wherein the assembly adapter includes a mechanical transfer (MT) ferrule cavity, which includes one or more coarse-alignment structures to guide an MT ferrule that encloses at least one optical fiber during assembly of the apparatus. The assembly adapter is fabricated using a solder-reflow-compatible material to facilitate bonding the assembly adapter to a circuit board.

In some embodiments, the apparatus further comprises a clamp that secures the MT ferrule in the MT ferrule cavity.

In some embodiments, the assembly adapter includes one or more clamp registration structures to facilitate attachment of the clamp.

In some embodiments, the apparatus further comprises a plug to protect an exposed surface of the optical connector after assembly of the apparatus.

In some embodiments, the apparatus further comprises a sealing window filled with a sealing material to protect an exposed surface of the optical connector after assembly of the apparatus.

In some embodiments, the apparatus further comprises a dust cap having the same dimensions as the MT ferrule, wherein the dust cap is used to fill the MT ferrule cavity when no MT ferrule is inserted.

In some embodiments, the assembly adapter is comprised of metal, whereby the assembly adapter functions as a heat sink.

In some embodiments, the assembly adapter is comprised of a liquid-crystal polymer (LCP) to facilitate high-volume, low-cost production.

In some embodiments, the optical connector is edge-coupled with the SiP chip in the POeM.

In some embodiments, the optical connector is face-coupled with the SiP chip in the POeM.

In some embodiments, the optical connector is butt-coupled with the MT ferrule after insertion of the MT ferrule.

In some embodiments, the assembly adapter includes a heat-sink-access opening to facilitate attaching a heat sink to one or more components in the POeM.

In some embodiments, the assembly adapter includes an embedded heat spreader to facilitate dissipating heat generated by one or more components in the POeM.

In some embodiments, the apparatus further comprises the circuit board, wherein the assembly adapter is soldered to the circuit board.

In some embodiments, components of the POeM are housed in cavities formed in the assembly adapter.

In some embodiments, the cavities formed in the assembly adapter include a connector cavity with a connector registration structure.

The disclosed embodiments also provide a method for assembling an optical-connector assembly that connects one or more optical fibers to an optoelectronic system. During operation, the method forms a packaged optoelectronic module (POeM) comprising an optical connector, a silicon photonic (SiP) chip, an integrated circuit (IC) chip, at least one laser chip and a package substrate. Next, the method face-down aligns and bonds an optical connector to a SiP chip to form a connector/SiP coupling. The method then face-down bonds an assembly adapter to the optical connector, wherein the assembly adapter includes a mechanical transfer (MT) ferrule cavity, which includes one or more coarse-alignment structures to guide an MT ferrule containing at least one optical fiber, during insertion of the MT ferrule into the MT ferrule cavity. Next, the method inserts a dust cap into the MT ferrule cavity, wherein the dust cap has the same dimensions as the MT ferrule. Then, the method uses a clamp to clamp together components of the optical-connector assembly. Finally, the method performs a solder-reflow operation to solder the assembly adapter to a circuit board.

In an alternative embodiment, instead of performing the solder-reflow operation last, the solder-reflow operation is performed after formation of the connector/SiP coupling, but before the assembly adapter is face-down bonded to the optical connector.

In some embodiments, the method further comprises connecting the MT ferrule to the optical-connector assembly by: (1) removing the clamp from the optical-connector assembly; (2) removing the dust cap from the MT ferrule cavity; (3) inserting the MT ferrule into the MT ferrule cavity; and (4) using the clamp to clamp together the components of the optical-connector assembly.

DETAILED DESCRIPTION

Figure 1:
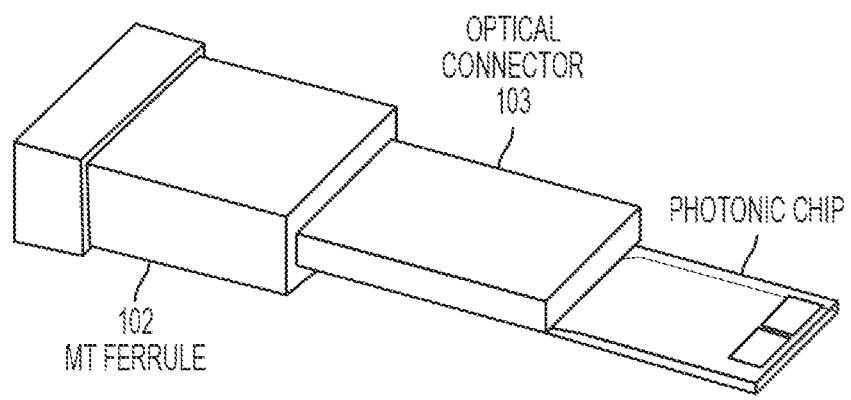
FIG. 1 illustrates an optical connector assembly (prior art).
Figure 2:
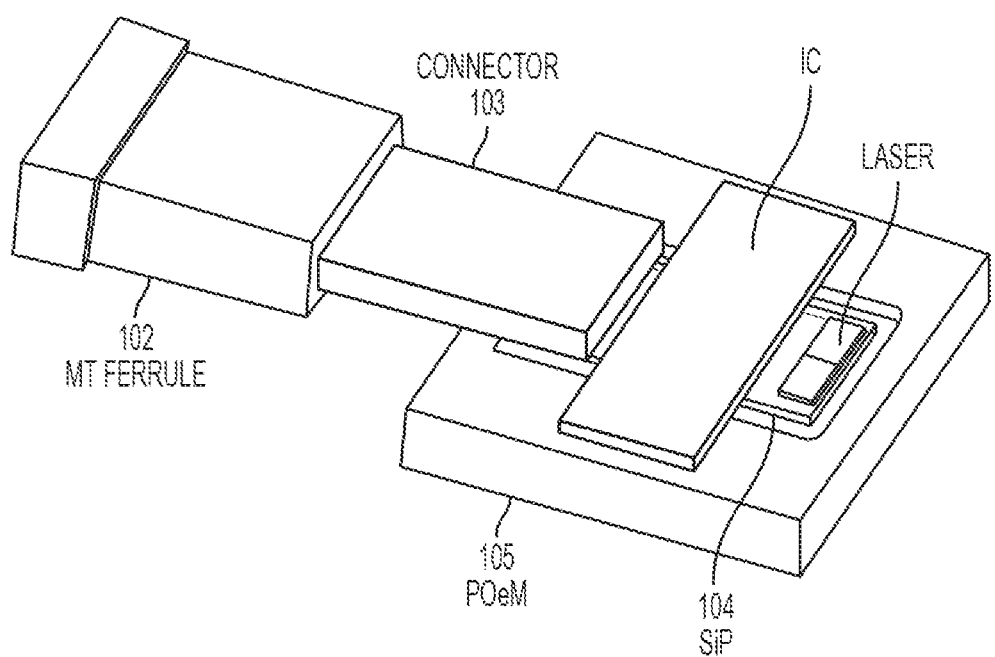
FIG. 2 illustrates an optical connector assembly including a POeM (prior art).

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

The disclosed embodiments provide an assembly adapter for optical system packaging that facilitates robust, rematable and reflow-compatible optical connectivity. By using this assembly adapter, the system-assembly process can be seamless and self-guided. Moreover, the fragile optical components, features and coupling interfaces are well-protected and supported both during assembly and in an operating environment. Moreover, the proposed assembly adapter is reflow-compatible and enhances thermal dissipation for packaged integrated circuit (IC) chips and laser dies.

Details

Figure 3:
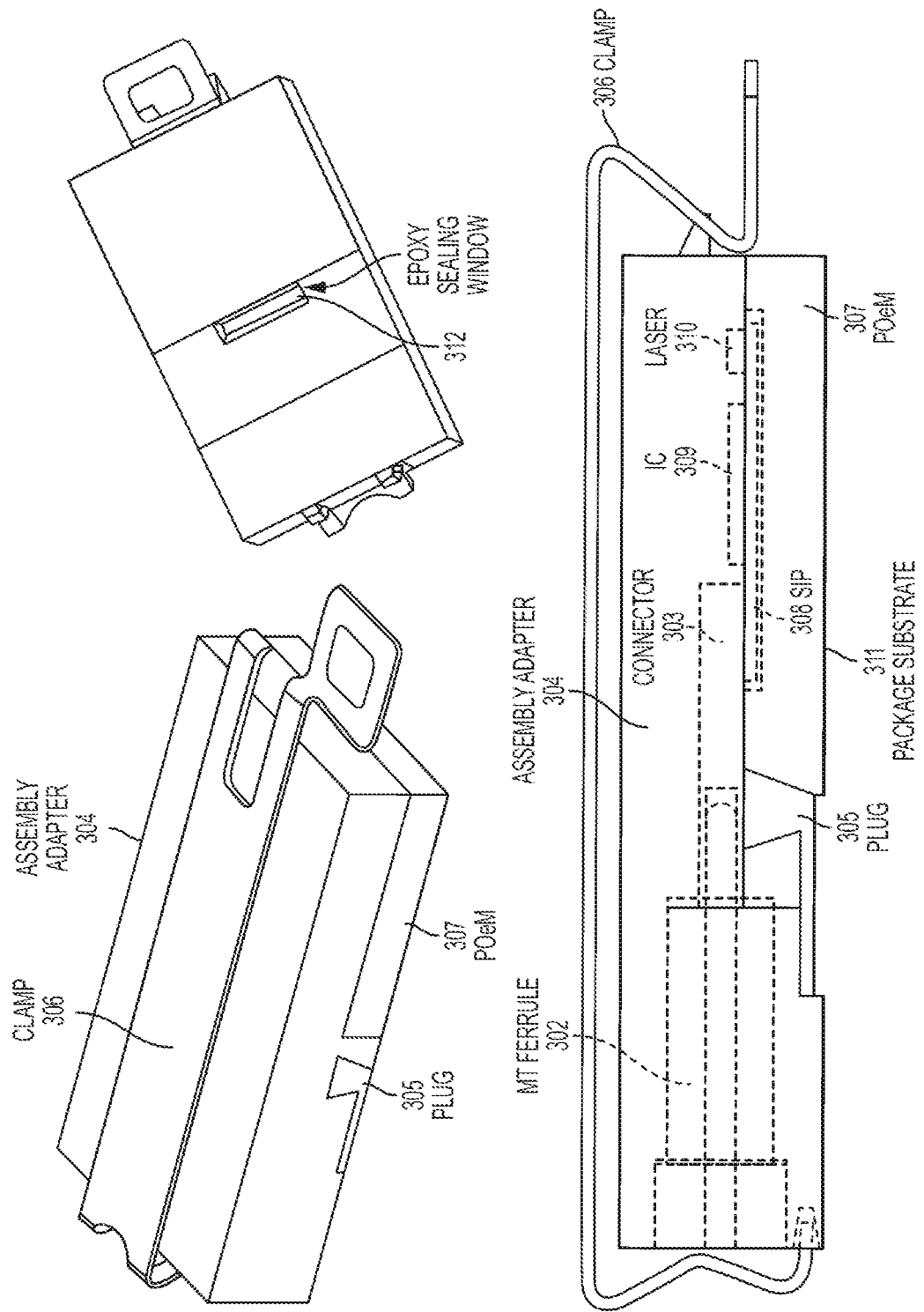
FIG. 3 illustrates a packaged optical system with an assembly adapter in accordance with the disclosed embodiments.
Figure 4:
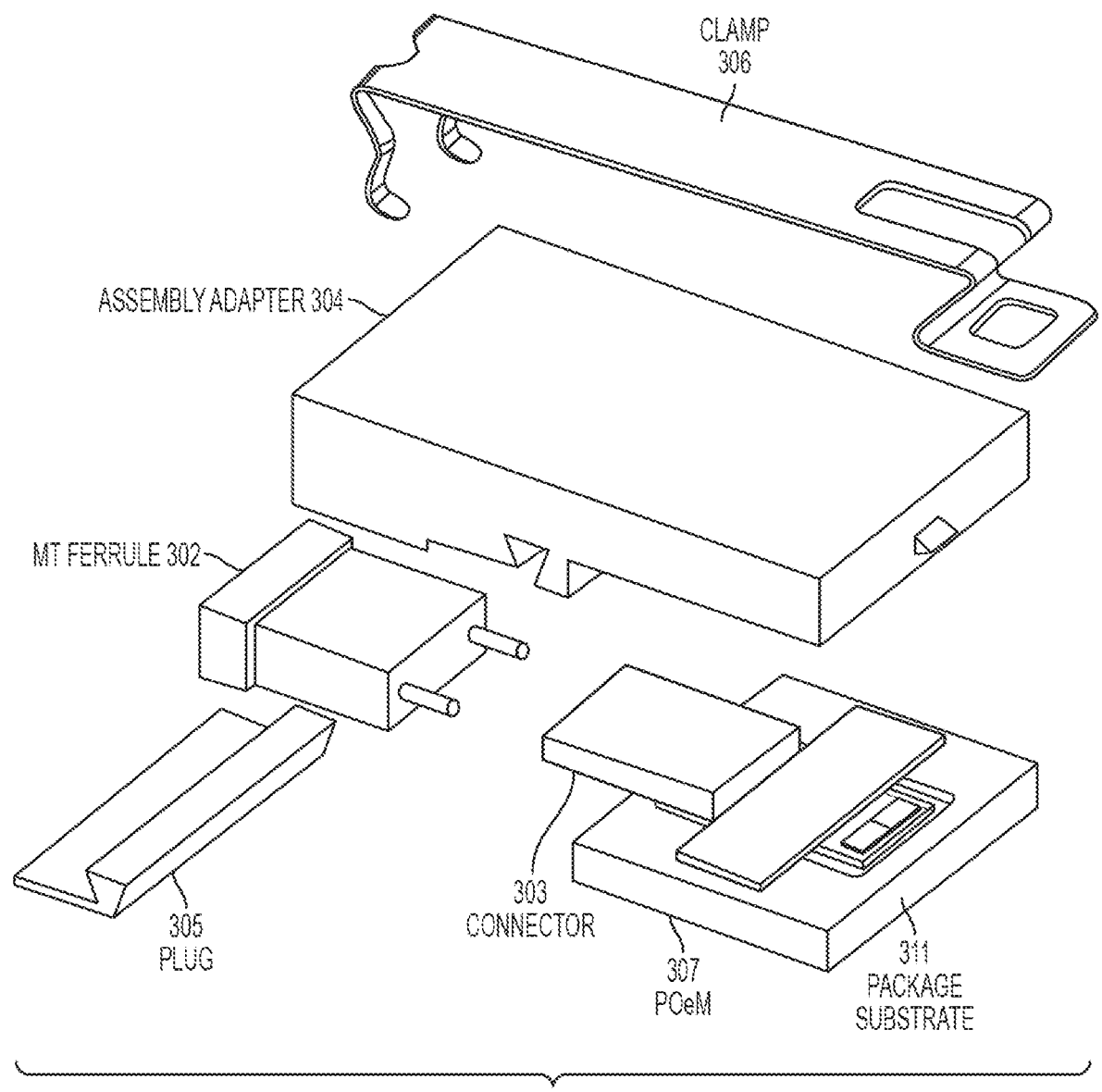
FIG. 4 illustrates components of a packaged optical system in accordance with the disclosed embodiments.

An assembled-view and exploded-view of an exemplary packaged optical system using an assembly adapter are shown in FIG. 3 and FIG. 4, respectively. This system comprises at least one MT ferrule 302 that encloses an optical fiber array, an optical connector 303 with passive optical wave-guiding and/or beam-shaping elements, an assembly adapter 304 with a plug 305 and a corresponding clamp 306, and a POeM 307, which includes a SiP photonic chip 308, a VLSI IC chip 309, a laser chip 310 and a package substrate 311.

The MT ferrule 302 contains an optical fiber array and is butt-coupled with optical connector 303. Note that MT ferrule 302 may include positive, negative or hermaphroditic features to enable accurate and precise alignment between the optical fibers in MT ferrule 302 and waveguides in an optical connector.

The optical connector 303 includes optical wave-guiding features that bridge the optical components on SiP chip 308 to an external fiber-connector (such as MT ferrule 302). On one end, optical connector 303 is butt-coupled with MT ferrule 302; on the other end, the optical connector 303 is face-coupled or edged-coupled with SiP chip 308 in POeM 307. Moreover, the integration of the illustrated connector can involve a lead-free and solder reflow-compatible process, which requires temperatures as high as 250-280° C. This means it will maintain good alignment and low-coupling loss between SiP chip 308 and an associated waveguide during subsequent lead-free, solder reflow processes.

POeM 307 includes: SiP chip 308, a VLSI IC chip 309, a laser chip 310 and package substrate 311 as described in [Zhang 2016]. Note that the SiP chip 308 is oriented face up and packaged in a module. Moreover, the SiP chip 308 electrically connects with package substrate 311 through one of the following: a redistribution layer, the VLSI IC chip 309, direct wire bonds, or electrical vias in SiP chip 308. Also, SiP chip 308 may include modulators, multiplexers, demultiplexers, photodetectors, waveguides, fiber couplers, and more. It can also be manufactured on an SOI technology platform.

The VLSI IC chip 309 is oriented face down and bonded with SiP chip 308. It can include several different circuit blocks, including but not limited to: modulator drivers, receivers, control circuits and serializer-deserializer (SERDES) circuits. Moreover, it may be manufactured in a bulk CMOS, SOI, SiGe or other technology node. The VLSI IC chip 309 may also include monolithically integrated electronic circuits.

The package substrate 311 can comprise a package substrate with a cavity, or alternatively a molded substrate formed using wafer-level packaging technology. The package substrate 311 has the hybrid integrated VLSI IC chip 309, laser chip 310 and optical connector 303 on one side, and electrical connectors (not shown) on the other side. These electrical connectors may comprise an array of pads, bumps, or pillars (copper pillars), and are designed to interface with the next-level package in a multi-chip module.

Figure 5:
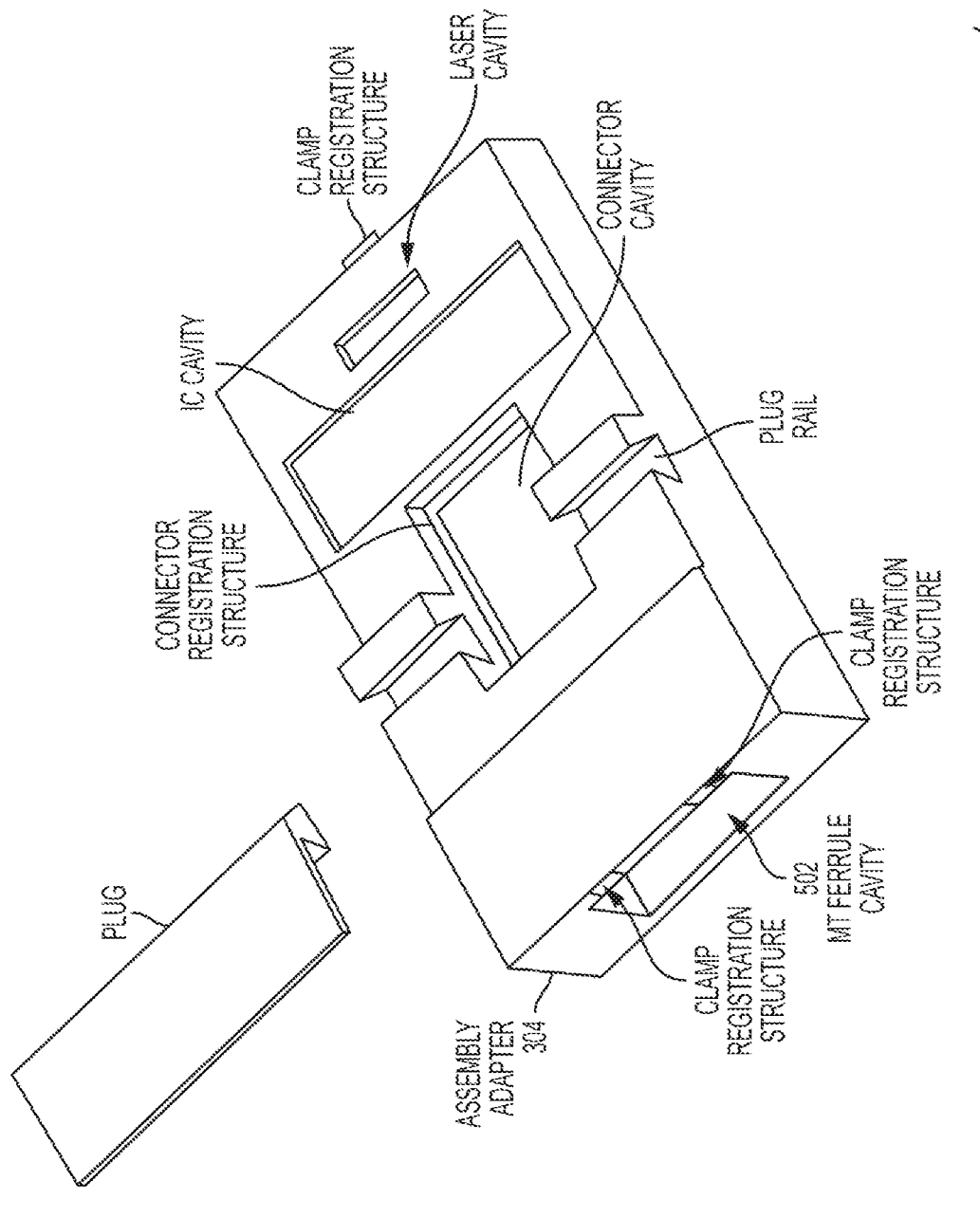
FIG. 5 illustrates an optical system assembly adapter in accordance with the disclosed embodiments.
Figure 6:
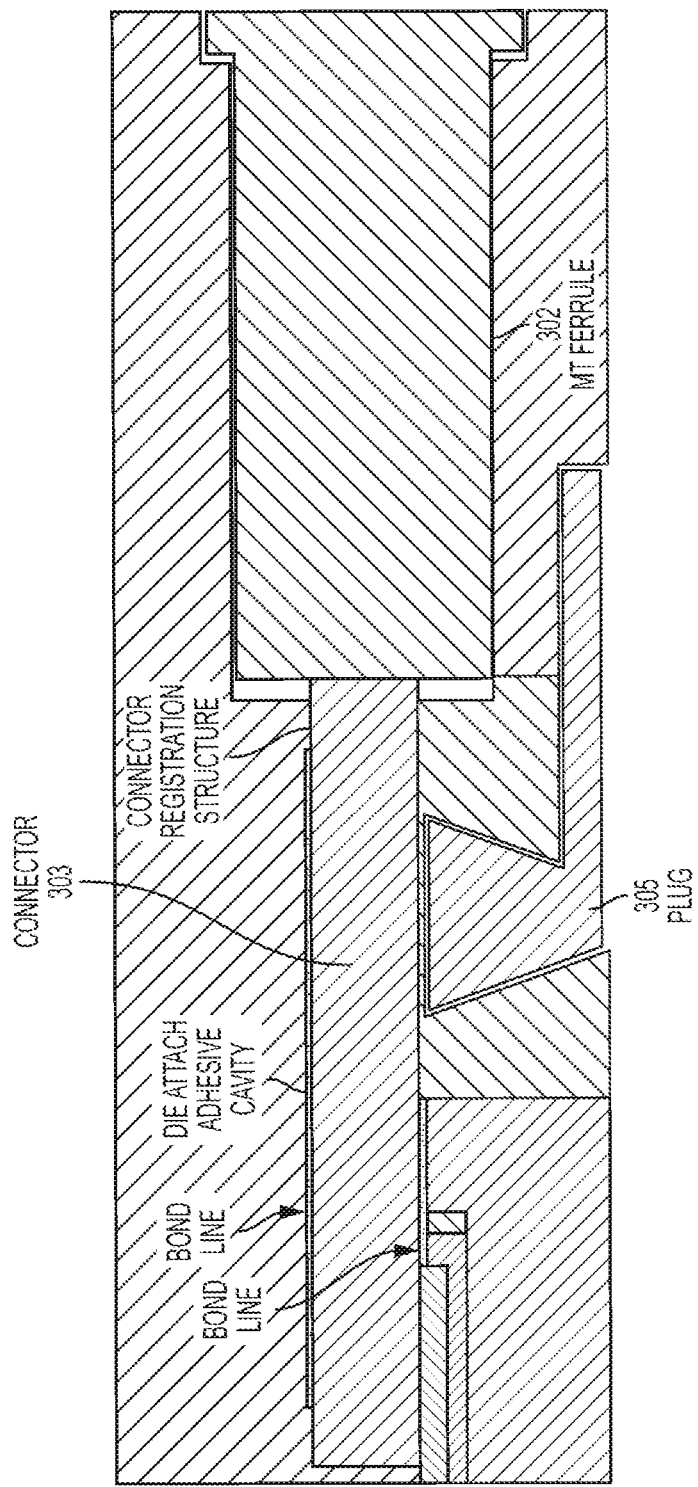
FIG. 6 illustrates a cross section of a packaged optical system in accordance with the disclosed embodiments.

The assembly adapter 304 is illustrated in more detail in FIG. 5, wherein the assembly adapter can include: housing features, position-registration features, and dust-prevention features. There also exist various housing features for the optical connector, the MT ferrule, and components of the optoelectronic module such as the IC chip, laser chip, SiP and package substrate. These housing features define the coarse positions of corresponding components. For example, an MT ferrule cavity 502 can provide coarse insertion guidance and prevent mechanical interference between the alignment structures on an MT ferrule and the optical connector during system assembly. Moreover, the position registration features define the final positions of assembled components as is illustrated in FIGS. 5 and 6. For example, the landing position of a clamp and the assembly depth of a connector in its cavity are well-defined by their corresponding registration structures. Note that the optical connector protrudes from the connector cavity and ensures that the connector can directly contact the MT ferrule after assembly. Because the assembly adapter 304 is bonded to the optical module package substrate and the connector, and the clamp is applied between the MT ferrule and assembly adapter 304, the clamping force will be mainly applied between the MT ferrule, the assembly adapter 304 and the protruding part of the connector. Therefore, the connector/SiP coupling interface, the SiP chip and most parts of the connector will be mechanically protected.

Referring to FIG. 3, the dust-prevention features include a sliding plug 305, an epoxy sealing window 312 and a dust cap (not shown), which is a component with the same dimensions as the MT ferrule and is used to fill the MT ferrule cavity if no MT ferrule is inserted. The exposed connector surface, which is sensitive to optical performance, is sealed by the sliding plug after assembly. Then, the exposed window is sealed using an epoxy or other sealing material. Note that the combination of the sliding plug 305 and sealing window 312 enclose the connector cavity without touching the critical connector/MT ferrule coupling interface. Also, the dust cap may have cleaning features, which can clean the facet of the optical connector before MT ferrule insertion.

The assembly adapter 304 can be made of various reflow-compatible materials. For example, a liquid crystal polymer (LCP), which is widely used for advanced socket substrates, could sustain the lead-free solder reflow process, and because it is compatible with injection molding, it is also a promising material for low-cost, high-volume adapter manufacturing. Alternatively, the assembly adapter 304 can be made of a high thermal conductivity metal, such as Cu or Al. Here, the metal assembly adapter 304 may be used as the primary heat sink to dissipate power generated within the module. It can also be designed to have mating features to allow attachment of a secondary heat sink with high-aspect ratio fins. Depending on the use case, the assembly adapter 304 can be secured to the board or package substrate by solder or an adhesive.

Adapter Assisted Optical System Assembly Process

Figure 7:
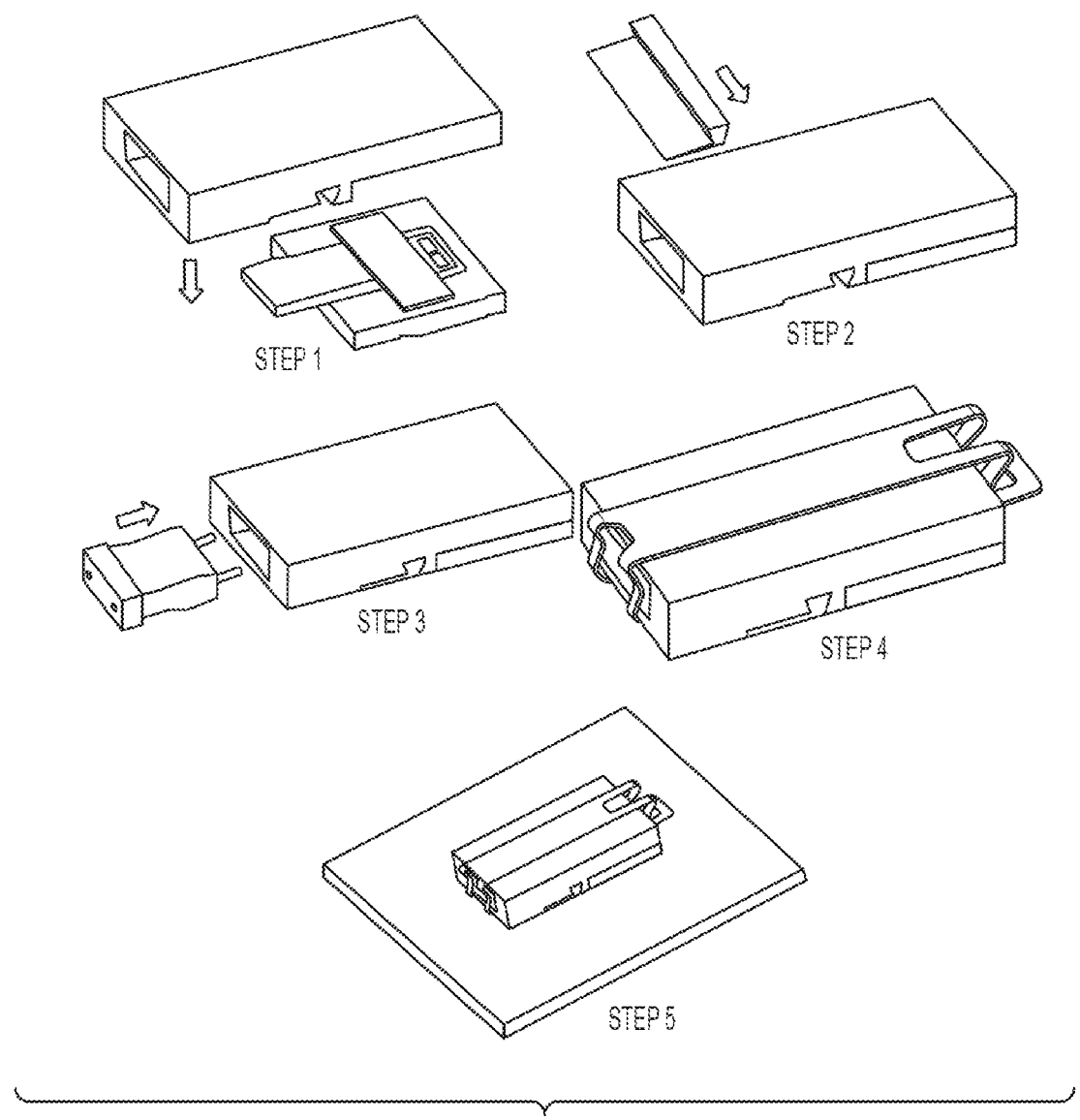
FIG. 7 illustrates a board-last assembly process for a packaged optical system in accordance with the disclosed embodiments.
Figure 8:
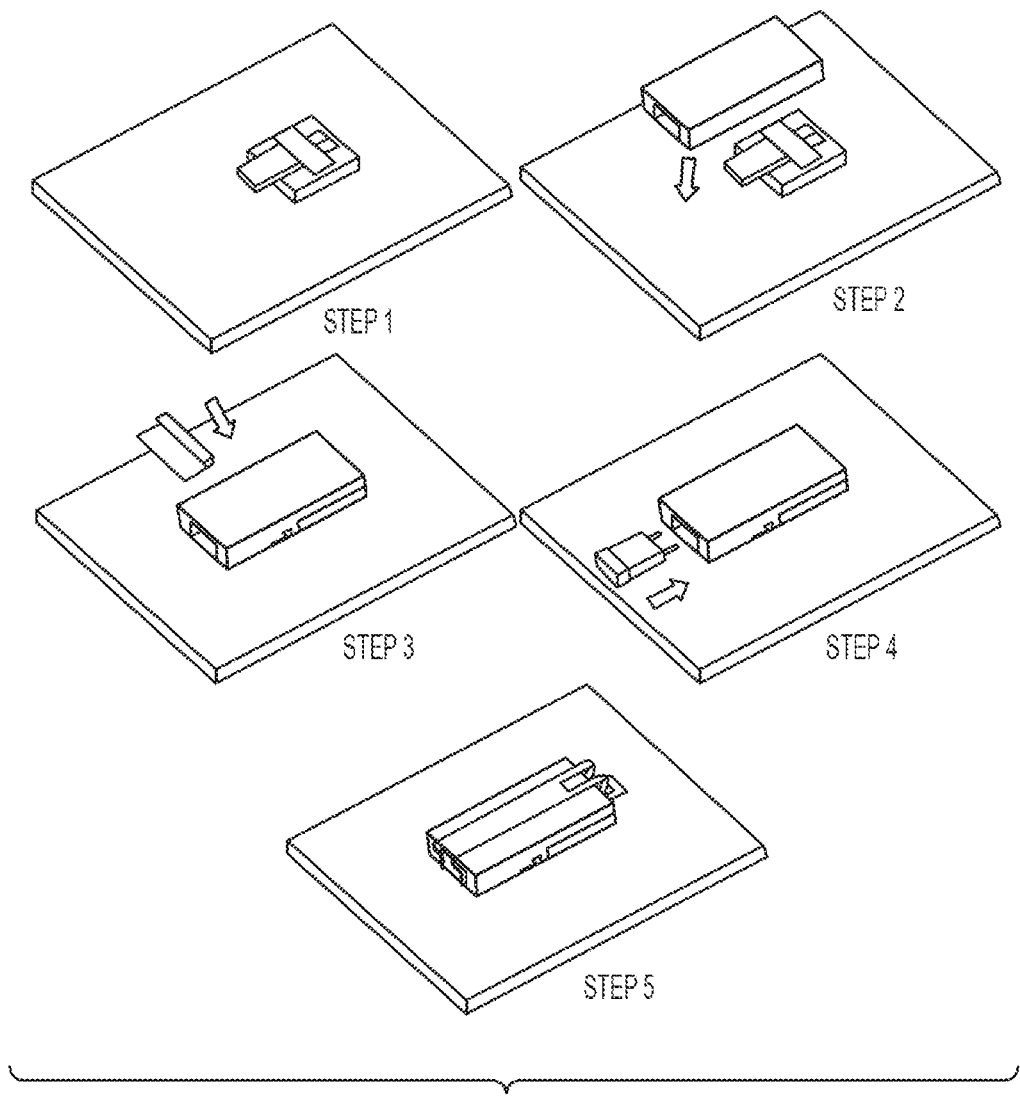
FIG. 8 illustrates a board-first assembly process for a packaged optical system in accordance with the disclosed embodiments.

FIGS. 7 and 8 present two scenarios for constructing an exemplary optical system with an assembly adapter: (1) board-last assembly and (2) board-first assembly. Board-last assembly proceeds as follows. First, the SiP chip is integrated face-up with an IC chip, laser chip and packaged substrate forming a packaged optoelectronic module (POeM or WL-POeM). Next, an optical connector is face-down aligned and bonded to the SiP chip to form the connector/SiP. Following this, the assembly adapter is face-down bonded to the connector and POeM using a die attach film or other adhesive material (Step 1). Note that the optical connector and the POeM components are housed in designed cavities in the assembly adapter. The exposed area of the optical connector is then sealed by the sliding plug and epoxy applied in the sealing window (Step 2). After inserting the dust cap, which has the same dimensions as the MT ferrule (Step 3), all components in the optical system are clamped together (Step 4). Finally, the assembled optical system is bonded to the board or other package substrate using solder reflow (Step 5).

Alternatively, a board-first assembly can be used as is illustrated in FIG. 8. During this board-first assembly process, the SiP chip is first face-up integrated with an IC chip, laser chip and packaged substrate forming a packaged optoelectronic module (POeM or WL-POeM). Next, the optical connector is face-down aligned and bonded at the SiP chip to form the connector/SiP coupling in the optical link. Next, the POeM/WL-POeM is attached to the board or other package substrate using a solder reflow process (Step 1). Following this, the assembly adapter is face-down bonded at the connector and the POeM using a die attach film or other adhesive material (Step 2). Note that the optical connector and POeM components are housed in designed cavities in the assembly adapter. Next, the exposed area of the optical connector is then sealed by the sliding plug (Step 3). After inserting the MT ferrule or dust cap (Step 4), all components in the optical system are clamped together (Step 5).

Improvements and Benefits

The assembly adapter and associated assembly techniques described in this disclosure address the challenges involved in manufacturing high-performance, compact, single-mode, reflow-compatible packaged optoelectronic modules that may be tightly integrated with a CPU/ASIC on a board or package substrate. In summary, it provides the following benefits:

Mechanical Support: The adapter assembly provides enhanced mechanical support and protects system components and associated critical coupling areas. During adapter-assisted assembly, a clamp is applied between the MT ferrule and the assembly adapter. The clamping force will be mainly applied between the MT ferrule, assembly adapter and the protruding part of the connector. Therefore, the critical connector/SiP coupling interface, the SiP chip and most of the connector will be mechanically protected.

Coarse Alignment: The assembly techniques use an MT-ferrule insertion guidance cavity and optical connector registration features to ensure rematable MT ferrule/optical connector coupling. Note that the MT ferrule cavity can provide coarse insertion guidance during system assembly. Moreover, a connector registration feature can define the assembly depth of the connector in its cavity. The combination of these two features will mitigate collisions between the fine-alignment features on the MT ferrule and optical connector, thereby making the MT ferrule/optical connector coupling rematable and durable.

Dust Protection: The assembly techniques enhance dust-prevention capabilities. The associated dust-prevention features include the sliding plug, the epoxy sealing window (see FIG. 3) and the dust cap, which prevent the MT ferrule/connector coupling interface from experiencing dust contamination.

Reflow Compatibility: The assembled optical system is compatible with an associated solder-reflow manufacturing operation. To reduce the footprint, and thereby address the reliability issues induced by a large-scale substrate, solder I/Os are used to connect the POeM substrate to the system board. Therefore, all components in the proposed optical system should ideally be reflow-compatible. To this end, the adapter could be made of LCP, metal (Cu and Al) and other reflow-compatible materials.

Integration with a Thermal-Management Solution: The optical system enhances thermal-dissipation capabilities by using a metal assembly adapter. More specifically, the assembly adapter can be made of a metal with a high thermal conductivity such as Cu, Al and so on. This metal assembly adapter can function as a preliminary heat sink for the IC and laser chips to enhance the system's thermal-dissipation capabilities. In addition, the adapter can be shaped to overcome the height difference between the IC and laser chips and provide a planar landing surface to attach the more powerful secondary heat sink.

Discussion

Figure 9B:
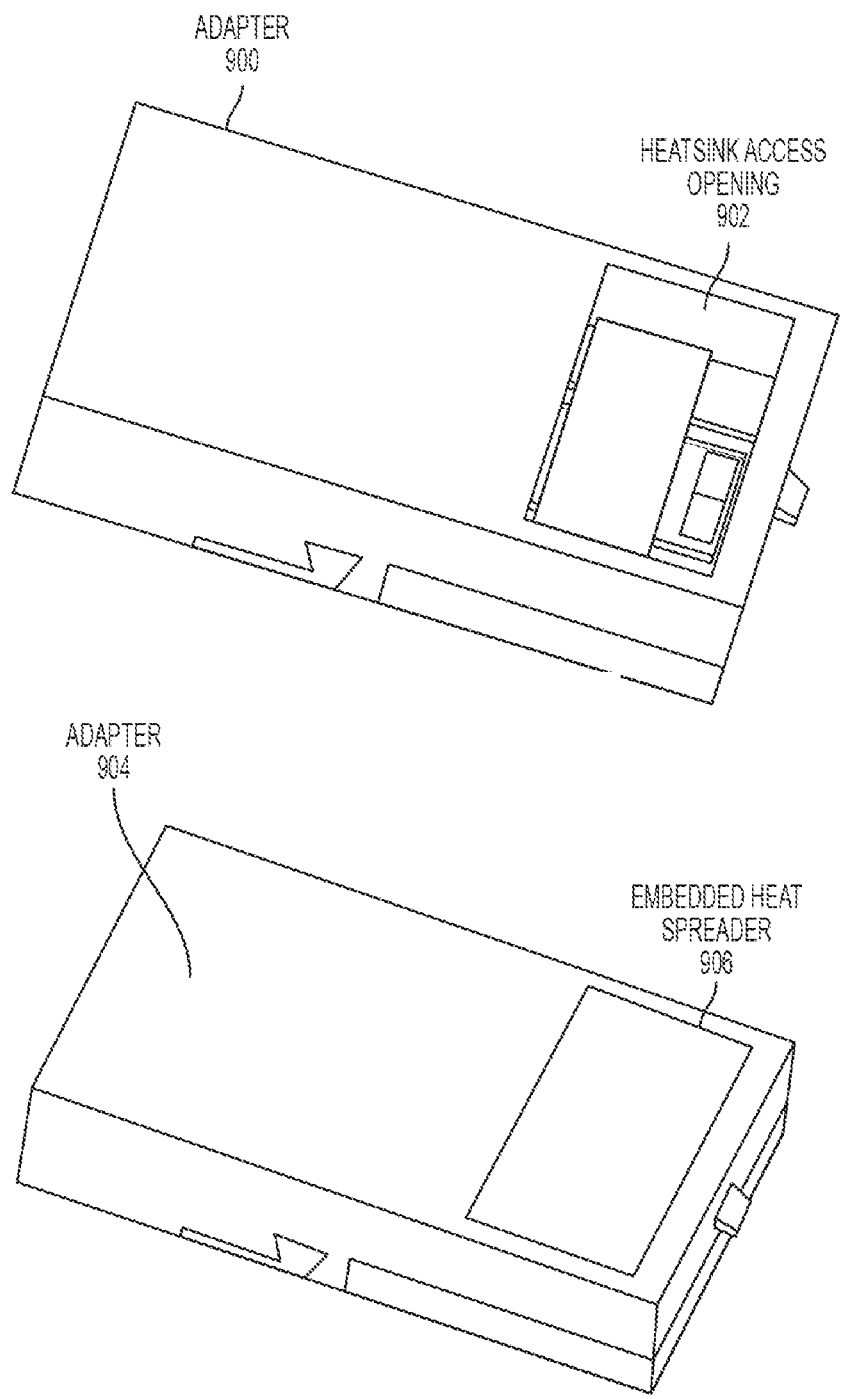
FIG. 9B illustrates a hybrid assembly adapter with an embedded heat spreader in accordance with the disclosed embodiments.
Figure 9A:
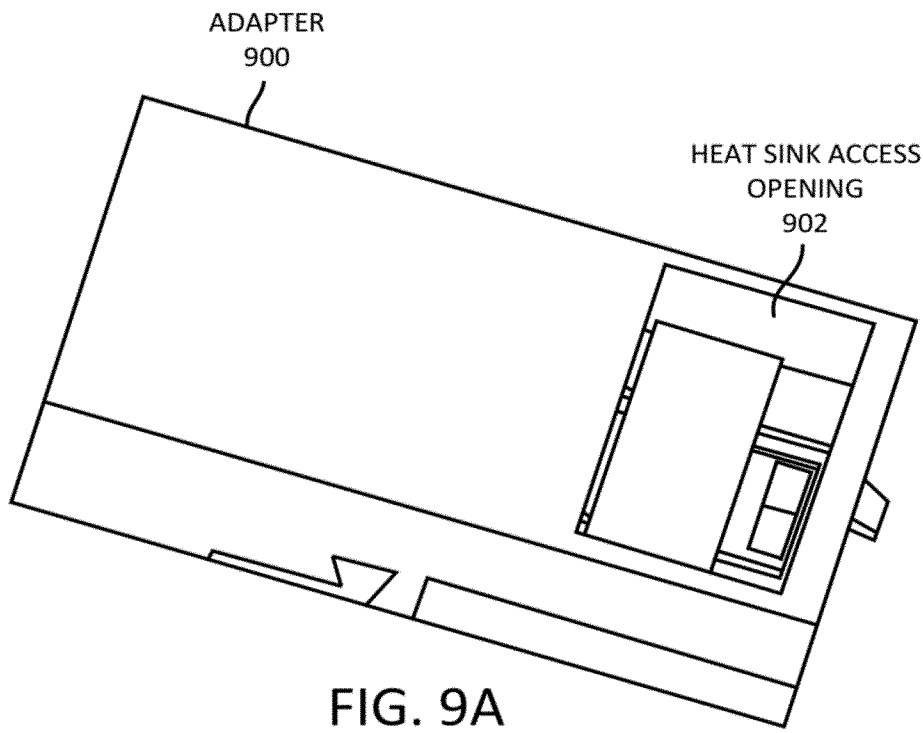
FIG. 9A illustrates a hybrid assembly adapter with a heat sink access opening in accordance with the disclosed embodiments.
Figure 9B:
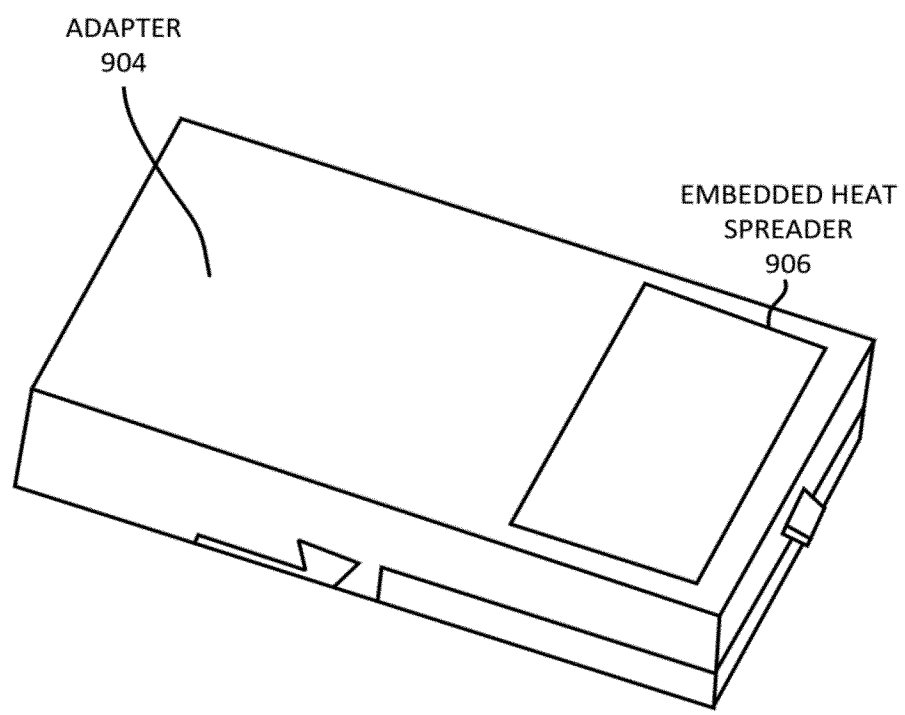

Several adapter-assisted optical system assembly techniques are discussed as follows. While a metal assembly adapter as described above, can be used to address the thermal-dissipation issues of a packaged optical system, it will likely not be cost-effective and otherwise suitable for volume manufacturing. To leverage the high thermal conductivity of metal, and low-cost, high-precision volume manufacturing capability of LCP, we propose a hybrid assembly adapter as is illustrated in FIGS. 9A and 9B. FIGS. 9A-9B illustrate two exemplary assembly adapters. The embodiment illustrated in FIG. 9A is an adapter 900 with a heat sink access opening 902, and the embodiment illustrated in FIG. 9B is an adapter 904 with an embedded heat spreader 906. Both of these adapters facilitate a low-thermal-impedance path between a heat sink and the hot chips, such as the IC and laser chips. Hence, both of these adapters provide enhanced thermal-dissipation capabilities for a packaged optical system.

Figure 10A:
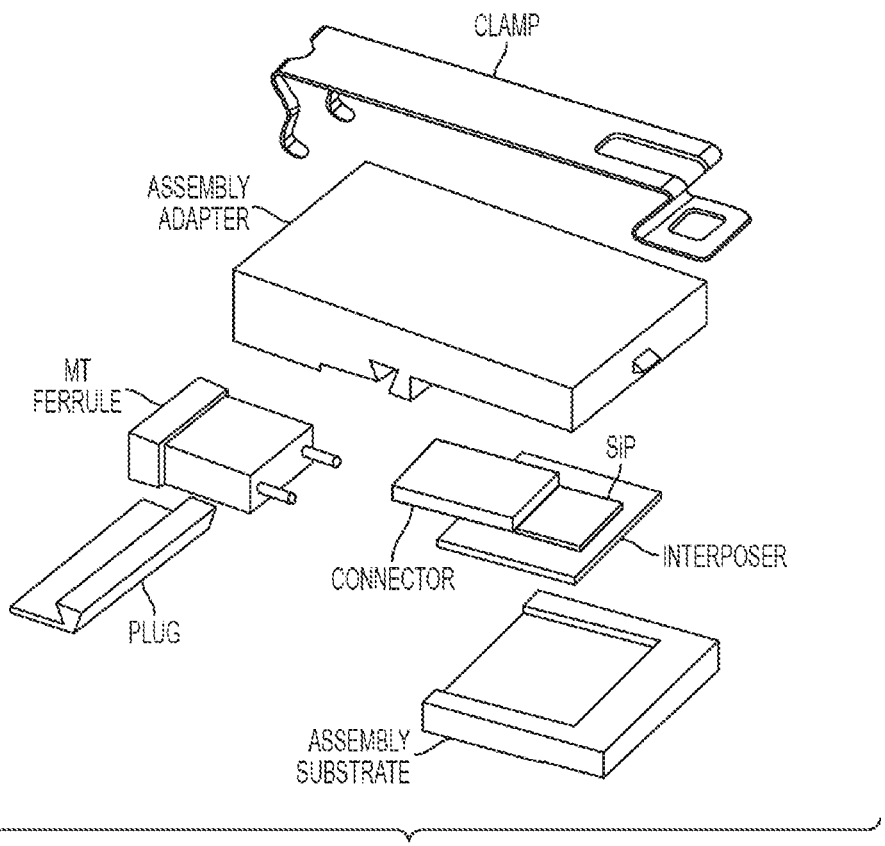
FIG. 10A illustrates components of an optical assembly adapter for an edge-coupled connector in accordance with the disclosed embodiments.
Figure 10B:
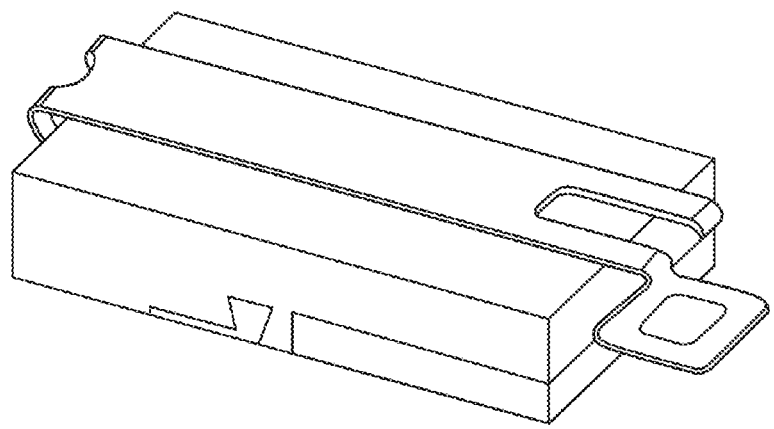
FIG. 10B illustrates an assembled optical assembly adapter for an edge-coupled connector in accordance with the disclosed embodiments.
Figure 11:
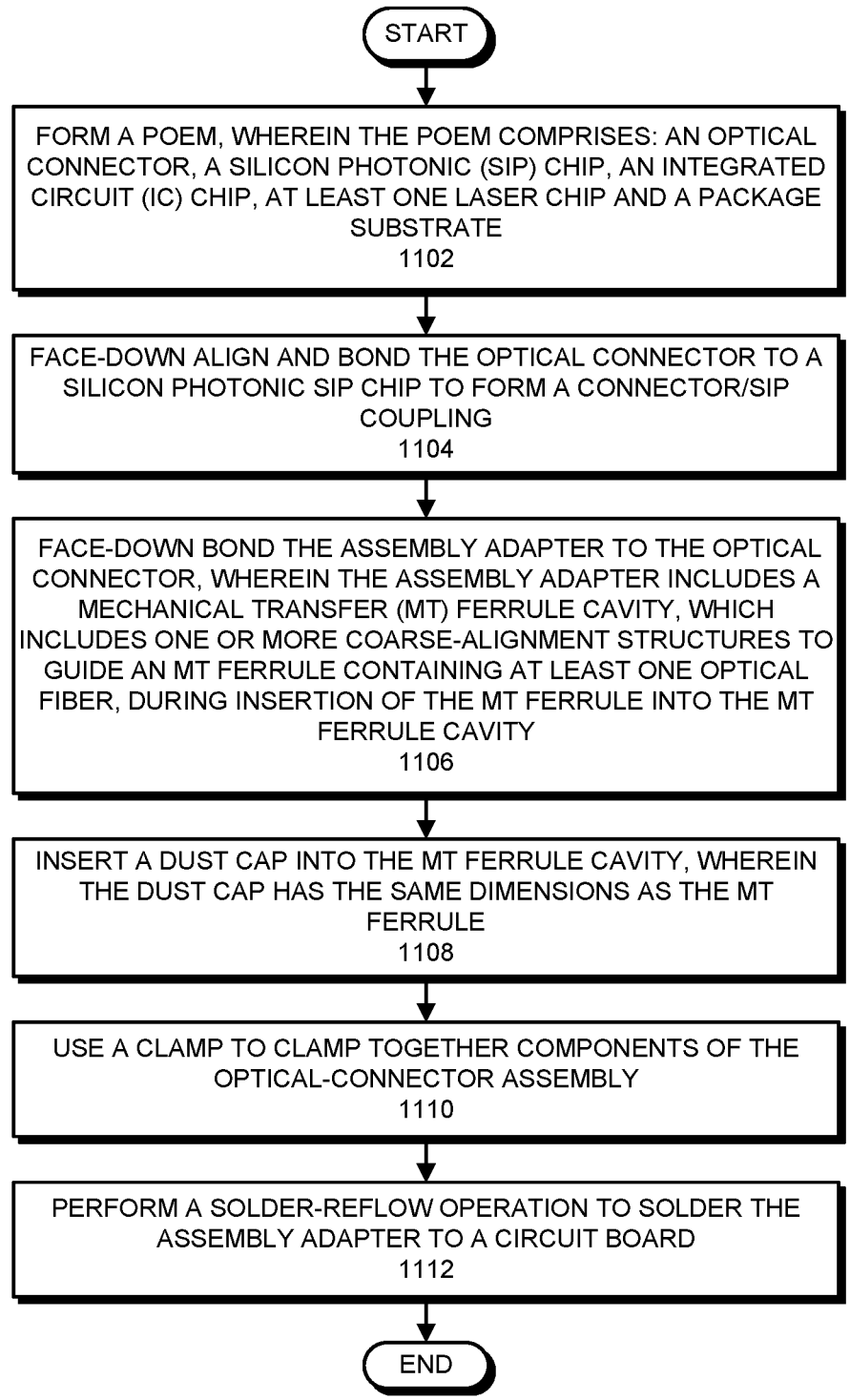
FIG. 11 presents a flow chart of an assembly process for a packaged optical system in accordance with the disclosed embodiments.

FIGS. 10A-10B illustrate an optical system assembly adapter for an edge-coupled connector and SiP chip. In particular, FIG. 10A presents an unassembled view of the assembly components, and FIG. 10B presents an assembled view. The embodiment illustrated in FIGS. 10A-10B has a similar mechanical design and assembly process as the adapter for a face-coupled connector and SiP. However, the housing features in the adapter are modified for the edge-coupled connector, the SiP chip and the corresponding interposer.

Assembly Process

The process of assembling an exemplary optical-connector assembly is as follows. First, a packaged optoelectronic module (POeM) is formed, wherein the POeM comprises: an optical connector, a silicon photonic (SiP) chip, an integrated circuit (IC) chip, at least one laser chip and a package substrate (step 1102). Next, the optical connector is face-down aligned and bonded to a SiP chip to form a connector/SiP coupling (step 1104). Then, the assembly adapter is face-down bonded to the optical connector, wherein the assembly adapter includes a mechanical transfer (MT) ferrule cavity, which includes one or more coarse-alignment structures to guide an MT ferrule containing at least one optical fiber, during insertion of the MT ferrule into the MT ferrule cavity (step 1106). Next, a dust cap is inserted into the MT ferrule cavity, wherein the dust cap has the same dimensions as the MT ferrule (Step 1108). Then, a clamp is used to clamp together components of the optical-connector assembly (step 1110). Finally, a solder-reflow operation is performed to solder the assembly adapter to a circuit board (step 1112). As mentioned above, instead of performing the solder-reflow operation last, the solder-reflow operation can alternatively be performed after formation of the connector/SiP coupling, but before the assembly adapter is face-down bonded to the optical connector.

System

Figure 12:
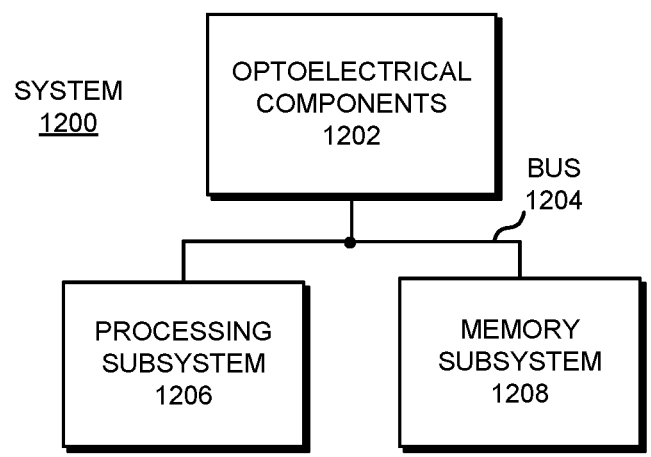
FIG. 12 illustrates a system that incorporates optical components with semiconductor chips in accordance with an embodiment of the present disclosure.

One or more of the preceding embodiments of the optical adapter assembly described above may be included in a system or device. More specifically, FIG. 12 illustrates a system 1200 that includes optoelectrical components 1202 with one or more optical assembly adapters. More specifically, system 1200 also includes a processing subsystem 1206 (with one or more processors) and a memory subsystem 1208 (with memory).

In general, system 1200 may be implemented using a combination of hardware and/or software. Thus, system 1200 may include one or more program modules or sets of instructions stored in a memory subsystem 1208 (such as DRAM or another type of volatile or non-volatile computer-readable memory), which, during operation, may be executed by processing subsystem 1206. Furthermore, instructions in the various modules in memory subsystem 1208 may be implemented in: a high-level procedural language, an object-oriented programming language, and/or in an assembly or machine language. Note that the programming language may be compiled or interpreted, e.g., configurable or configured, to be executed by the processing subsystem.

Components in system 1200 may be coupled by signal lines, links or buses, for example bus 1204. These connections may include electrical, optical, or electro-optical communication of signals and/or data. Furthermore, in the preceding embodiments, some components are shown directly connected to one another, while others are shown connected via intermediate components. In each instance, the method of interconnection, or "coupling," establishes some desired communication between two or more circuit nodes, or terminals. Such coupling may often be accomplished using a number of photonic or circuit configurations, as will be understood by those of skill in the art; for example, photonic coupling, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Furthermore, functionality in the preceding embodiments may be implemented more in hardware and less in software, or less in hardware and more in software, as is known in the art. In general, system 1200 may be at one location or may be distributed over multiple, geographically dispersed locations.

System 1200 may include: a switch, a hub, a bridge, a router, a communication system (such as a wavelength-division-multiplexing communication system), a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a tablet computer, a supercomputer, a network-attached-storage (NAS) system, a storage-area-network (SAN) system, a media player (such as an MP3 player), an appliance, a subnotebook/netbook, a tablet computer, a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device.

Moreover, the optoelectrical components 1202 can be used in a wide variety of applications, such as: communications (for example, in a transceiver, an optical interconnect or an optical link, such as for intra-chip or inter-chip communication), a radio-frequency filter, a biosensor, data storage (such as an optical-storage device or system), medicine (such as a diagnostic technique or surgery), a barcode scanner, metrology (such as precision measurements of distance), manufacturing (cutting or welding), a lithographic process, data storage (such as an optical-storage device or system) and/or entertainment (a laser light show).

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. An apparatus that connects one or more optical fibers to an optoelectronic system, comprising:
a wafer-level packaged optoelectronic module (POeM) comprising an optical connector, a silicon photonic (SiP) chip, an integrated circuit (IC) chip, at least one laser chip and a package substrate; and
an assembly adapter enclosing the POeM;

wherein the assembly adapter includes a mechanical transfer (MT) ferrule cavity, which includes one or more coarse-alignment structures to guide an MT ferrule enclosing at least one optical fiber during assembly of the apparatus;

wherein the assembly adapter is comprised of a solder-reflow-compatible material to facilitate bonding the assembly adapter to a circuit board; and a clamp that secures the MT ferrule in the MT ferrule cavity, wherein the clamp is applied between the MT ferrule and assembly adapter such that clamping force will be mainly applied between the MT ferrule, the assembly adapter and a protruding part of the optical connector, wherein the clamp mechanically protects the optical connector and the SiP chip.

2. The apparatus of claim 1, wherein the assembly adapter includes one or more clamp registration structures to facilitate attachment of the clamp.

3. The apparatus of claim 1, further comprising a plug to protect an exposed surface of the optical connector after assembly of the apparatus.

4. The apparatus of claim 1, further comprising a sealing window filled with a sealing material to protect an exposed surface of the optical connector after assembly of the apparatus.

5. The apparatus of claim 1, further comprising a dust cap having the same dimensions as the MT ferrule, wherein the dust cap is used to fill the MT ferrule cavity when no MT ferrule is inserted.

6. The apparatus of claim 1, wherein the assembly adapter is comprised of metal, whereby the assembly adapter functions as a heat sink.

7. The apparatus of claim 1, wherein the assembly adapter is comprised of a liquid-crystal polymer (LCP) to facilitate high-volume, low-cost production.

8. The apparatus of claim 1, wherein the optical connector is edge-coupled with the SiP chip in the POeM.

9. The apparatus of claim 1, wherein the optical connector is face-coupled with the SiP chip in the POeM.

10. The apparatus of claim 1, wherein the optical connector is butt-coupled with the MT ferrule after insertion of the MT ferrule.

11. The apparatus of claim 1, wherein the assembly adapter includes a heat-sink-access opening to facilitate attaching a heat sink to one or more components in the POeM.

12. The apparatus of claim 1, wherein the assembly adapter includes an embedded heat spreader to facilitate dissipating heat generated by one or more components in the POeM.

13. The apparatus of claim 1, further comprising the circuit board, wherein the assembly adapter is soldered to the circuit board.

14. The apparatus of claim 1, wherein components of the POeM are housed in cavities formed in the assembly adapter.

15. The apparatus of claim 14, wherein the cavities formed in the assembly adapter include a connector cavity with a connector registration structure.

16. A system, comprising:
at least one processor; and
at least one memory coupled to the at least one processor;
wherein the system includes optoelectronic components, including an optoelectronic connector, comprising:
a wafer-level packaged optoelectronic module (POeM) comprising an optical connector, a silicon photonic (SiP) chip, an integrated circuit (IC) chip, at least one laser chip and a package substrate; and
an assembly adapter enclosing the POeM;
wherein the assembly adapter includes a mechanical transfer (MT) ferrule cavity, which includes one or more coarse-alignment structures to guide an MT ferrule enclosing at least one optical fiber during assembly of the apparatus;
wherein the assembly adapter is comprised of a solder-reflow-compatible material to facilitate bonding the assembly adapter to a circuit board; and
a clamp that secures the MT ferrule in the MT ferrule cavity, wherein the clamp is applied between the MT ferrule and assembly adapter such that clamping force will be mainly applied between the MT ferrule, the assembly adapter and a protruding part of the optical connector, wherein the clamp mechanically protects the optical connector and the SiP chip.

17. A method for assembling an optical-connector assembly that connects one or more optical fibers to an optoelectronic system, comprising:
forming a wafer-level packaged optoelectronic module (POeM) comprising an optical connector, a silicon photonic (SiP) chip, an integrated circuit (IC) chip, at least one laser chip and a package substrate;
face-down aligning and bonding an optical connector to a SiP chip to form a connector/SiP coupling;
face-down bonding an assembly adapter to the optical connector, wherein the assembly adapter includes a mechanical transfer (MT) ferrule cavity, which includes one or more coarse-alignment structures to guide an MT ferrule containing at least one optical fiber, during insertion of the MT ferrule into the MT ferrule cavity;
inserting a dust cap into the MT ferrule cavity, wherein the dust cap has the same dimensions as the MT ferrule;
using a clamp to clamp together components of the optical-connector assembly; and
performing a solder-reflow operation to solder the assembly adapter to a circuit board; and
wherein the clamp secures the MT ferrule in the MT ferrule cavity, wherein the clamp is applied between the MT ferrule and assembly adapter such that clamping force is mainly applied between the MT ferrule, the assembly adapter and a protruding part of the optical connector, wherein the clamp mechanically protects the optical connector and the SiP chip.

18. The method of claim 17, wherein the solder-reflow operation takes place at one of the following times:
after forming the connector/SiP coupling, but before the assembly adapter is face-down bonded to the optical connector; and
after clamping together the components of the optical-connector assembly.

19. The method of claim 18, further comprising connecting the MT ferrule to the optical-connector assembly by:
removing the clamp from the optical-connector assembly;
removing the dust cap from the MT ferrule cavity;
inserting the MT ferrule into the MT ferrule cavity; and
using the clamp to clamp together the components of the optical-connector assembly.

* * * * *

UNITED STATES PATENT AND TRADEMARK OFFICE
CERTIFICATE OF CORRECTION

PATENT NO. : 10,591,689 B2
APPLICATION NO. : 15/425887
DATED : March 17, 2020
INVENTOR(S) : Zhang et al.

It is certified that error appears in the above-identified patent and that said Letters Patent is hereby corrected as shown below:

In the Drawings

Please replace Figs. 9A and 9B with Figs. 9A and 9B as shown on the attached page.

Signed and Sealed this
Seventeenth Day of November, 2020

Andrei Iancu
*Director of the United States Patent and Trademark Office*